Patented Feb. 15, 1949

2,461,954

UNITED STATES PATENT OFFICE 2,461,954

MANUFACTURE OF BUTADIENE-STYRENE COPOLYMER CEMENTS

Ernest G. Bargmeyer, Mishawaka, Ind., assignor to United States Rubber Company, New York, N. Y., a corporation of New Jersey No Drawing. Application April 20, 1944, Serial No. 531,990

5 Claims. (Cl. 260—29.1)

This invention relates to the improvements in butadiene-styrene copolymer rubber cements.

Prior cements prepared from Buna S (GRS) type of synthetic rubber (elastomer), which rubber generally contains a predominant amount of butadiene-1,3 and a minor proportion of styrene, such as disclosed in U. S. Patent No. 1,938,731 (preferably from about 65% to about 75% butadiene and from about 35% to about 25%, respectively, of styrene) have lacked sufficient tack and strength for operations such as assembling footwear parts where strains are involved.

I have discovered that I can provide an improved cement by heating the Buna S rubber with a fraction (usually less than 0.5 part, by weight, based on the GRS) of the total amount of sulfur predetermined for the final cement for a time sufficient to give the Buna S a slight precure, preferably in the presence of accelerating ingredients such as zinc oxide and/or accelerator. Modifying agents such as carbon black, softeners, tackifying resins, antioxidants, etc., may or may not be present in whole or in part. The precure can be carried out on the mill, in hot air, atmospheric pressure, in hot air under pressure, in steam under pressure, or in air and steam mixtures under pressure. The time may vary depending on the temperature. The temperature generally ranges from 250° F. to 290° F.

After the precure the stock containing some combined sulfur is broken down on a mill or masticator (Banbury) and mixed with the additionally required sulfur and other ingredients, as desired, during or after the breakdown. The stock is then made into a cement by the usual methods, such as adding naphtha or other solvent, and mixing in a cement churn until a uniform, smooth cement is obtained.

Cements made by the present method are characterized by considerably improved strength as compared with a cement made without such preliminary heating with a small amount of sulfur, as shown below.

The following base compound is an example of a satisfactory adhesive, the parts being by weight:

Buna S _____ 100.00
Modified coumarone-indene resin (tackifier) _____ 20.00
Semi-reinforcing carbon black _____ 60.00
Zinc oxide _____ 5.00
Benzothiazyl disulfide (accelerator) ____ 0.75
Diorthotolyl guanidine (accelerator) ____ 2.25
Sulfur _____ 0.25

The above compound is heated, for example, two hours at a temperature of 260° F. After cooling, it is milled on a conventional rubber mill and additional sulfur, as 1.25 parts, added, and dissolved in gasoline, rubber solvent grade. The table below shows the adhesions obtained when test strips of a suitable Buna S stock, such as may be used in the manufacture of rubber footwear, rain coats, etc., are cemented with this cement, along with those of an identical cement which has not been preheat-treated with sulfur.

| Base Stock | Drying Time of Cement Stock Before Assembling | Uncured Adhesion, Lbs. per. sq. inch | Adhesion After Cure, Lbs. per. sq. inch |
|---|---|---|---|
| Heat Treated | 15 min. | 3.0 | |
|  | 16 hours | 6.0 | 36.4 |
| Unheated | 15 min. | 2.0 | |
|  | 16 hours | 2.0 | 31.7 |

The proportions of carbon black and tackifier resin content, as well as the types of these materials may of course be varied. For example, the following cement is a spreader cement for fabric which is subsequently calender-coated, as well as for adhering Buna S stock to itself:

Buna S _____ 100.00
Rosin _____ 25.00
Channel carbon black _____ 10.00
Zinc oxide _____ 5.00
Benzothiazyl sulfide _____ 0.75
Diorthotolyl guanidine _____ 2.25
Sulfur _____ 0.25

After heating four hours at 260° F. an additional 1.25 parts of sulfur is milled into this stock and milling continued until a smooth mix is obtained. It is then dissolved in gasoline, rubber solvent grade, as in standard cement practice.

The table below shows the adhesions that may be obtained as compared with an identical cement made from a non-heat-treated stock.

| Base Stock | Adhesion to Cement-Spread Sheeting (uncured) | Adhesion of Buna S Stock (uncured) | Drying Time |
|---|---|---|---|
|  | Lbs./in. | Lbs./in. |  |
| Heat-Treated | 6 | 8 | 16 min. |
|  | 10 | 18 | 16 hrs. |
| Un-heated | 2 | 2 | 15 min. |
|  | 3.5 | 8 | 16 hrs. |

Drying is done at room temperature, although elevated temperatures may be employed with a consequent reduction in drying time wherever practicable.

Having thus described my invention, what I claim and desire to protect by Letters Patent is:

1. A method of preparing an improved adhesive cement from an uncured 1,3-butadiene-styrene copolymer rubber which comprises mixing the uncured copolymer rubber with a small fraction of the predetermined total amount of sulphur needed for curing the copolymer rubber of the final cement, but less than 0.5 part per 100 parts by weight of the copolymer, to a soft vulcanized state, said fraction being sufficient to give said copolymer a slight precure, and heating the mix sufficiently to slightly precure the copolymer, then mixing the slightly precured copolymer rubber with the remainder of the sulfur, and dissolving the mix in an organic solvent to produce the cement.

2. In a method of preparing an adhesive cement from an uncured 1,3-butadiene-styrene copolymer rubber, sulfur and compounding ingredients, including carbon black and tackifying resin, the steps of segregating a minor proportion (some but less than 0.5 part per 100 parts by weight of the copolymer) of the required sulfur sufficient to produce a soft vulcanized uncured copolymer, mixing it with the said copolymer, heating the mix at a temperature and for a time sufficient to substantially complete the combination of said minor amount of sulfur and the copolymer, subsequently mixing in the remainder of the required sulfur to produce a soft vulcanized copolymer, and dissolving the mix in an organic solvent whereby to produce a cement of increased adhesive power.

3. A method of preparing an improved adhesive cement from an uncured 1,3-butadiene-styrene copolymer rubber which comprises mixing the uncured copolymer rubber with some but less than about .5 part by weight of sulfur, based on 100 parts by weight of the copolymer, heating the mix at a temperature and for a time sufficient to substantially complete the combination of said minor amount of sulfur and the copolymer, subsequently mixing in the remainder of the required sulfur to produce a soft vulcanized copolymer, and dissolving the mix in an organic solvent whereby to produce a cement of increased adhesive power.

4. A method of preparing an improved adhesive cement from an uncured 1,3-butadiene-styrene copolymer rubber which comprises mixing the uncured rubbery copolymer with some but less than 0.5 part by weight of sulfur, based on 100 parts of the copolymer, heating the mix to substantially complete the combination of said sulfur with the uncured copolymer, then mixing the so-treated copolymer with additional sulfur so that the total sulfur is about 2 parts based on 100 parts of the copolymer, and dissolving the mix in an organic solvent.

5. In a method of preparing an adhesive cement from an uncured 1,3-butadiene-styrene copolymer rubber, sulfur and compounding ingredients, including carbon black and tackifying resin, the steps of segregating the sulfur in an amount less than 0.5 percent by weight (based on the copolymer) but effective upon heating with the copolymer to slightly cure the copolymer, heating the mix for a time and at a temperature sufficient to bring about said partial cure, subsequently mixing in the remainder of the required sulfur to produce a desired soft vulcanized copolymer, and afterwards dissolving the mix in an organic solvent whereby to produce a cement of increased adhesive power.

ERNEST G. BARGMEYER.

REFERENCES CITED

The following references are of record in the file of this patent:

UNITED STATES PATENTS

| Number | Name | Date |
|---|---|---|
| 1,384,773 | Molony | July 19, 1921 |
| 2,397,774 | Buckley | Apr. 2, 1946 |